(12) United States Patent
Lyle et al.

(10) Patent No.: US 7,568,227 B2
(45) Date of Patent: Jul. 28, 2009

(54) SYSTEM AND METHOD FOR ANALYZING PROTOCOL STREAMS FOR A SECURITY-RELATED EVENT

(75) Inventors: Michael P. Lyle, San Jose, CA (US); Dan Vekhter, San Carlos, CA (US); Brandon Suzuki, Sunnyvale, CA (US)

(73) Assignee: Symantec Corporation, Cupertino, CA (US)

( * ) Notice: Subject to any disclaimer, the term of this patent is extended or adjusted under 35 U.S.C. 154(b) by 811 days.

(21) Appl. No.: 09/964,272

(22) Filed: Sep. 25, 2001

(65) Prior Publication Data

US 2002/0124187 A1 Sep. 5, 2002

Related U.S. Application Data

(60) Provisional application No. 60/236,899, filed on Sep. 28, 2000.

(51) Int. Cl.
*G06F 12/16* (2006.01)
*G06F 11/30* (2006.01)

(52) U.S. Cl. .................. 726/22; 713/188; 714/39

(58) Field of Classification Search ............... 713/201, 713/188; 714/39; 726/22
See application file for complete search history.

(56) References Cited

U.S. PATENT DOCUMENTS

| | | | | | |
|---|---|---|---|---|---|
| 5,325,528 | A | * | 6/1994 | Klein | 719/313 |
| 5,347,524 | A | * | 9/1994 | I'Anson et al. | 714/39 |
| 5,610,903 | A | * | 3/1997 | Crayford | 370/213 |
| 6,044,445 | A | * | 3/2000 | Tsuda et al. | 711/163 |
| 6,122,743 | A | * | 9/2000 | Shaffer et al. | 713/201 |
| 6,275,574 | B1 | * | 8/2001 | Oran | 379/201.01 |
| 6,292,467 | B1 | * | 9/2001 | Keller | 370/241 |
| 6,321,338 | B1 | | 11/2001 | Porras et al. | |
| 6,334,192 | B1 | * | 12/2001 | Karpf | 714/1 |
| 6,363,458 | B1 | * | 3/2002 | Park | 711/141 |
| 6,425,009 | B1 | * | 7/2002 | Parrish et al. | 709/224 |
| 6,467,041 | B1 | * | 10/2002 | Blam | 713/310 |
| 6,484,203 | B1 | | 11/2002 | Porras et al. | |
| 6,487,666 | B1 | * | 11/2002 | Shanklin et al. | 713/201 |
| 6,535,551 | B1 | * | 3/2003 | Sweitzer et al. | 375/225 |
| 6,539,426 | B1 | * | 3/2003 | Meek et al. | 709/223 |

(Continued)

FOREIGN PATENT DOCUMENTS

EP 0 474 932 A1 3/1992

OTHER PUBLICATIONS

Wijendran, Leonard, "AWK-to-C Translator," Jan. 6, 1996, pp. 1-2.*
Mangione-Smith, Bill, "How many vector register are useful?" Feb. 2, 1993, pp. 1-2.*
"User-land states" pp. 1-2 <http://www.faqs.org/docs/iptables/userlandstates.html>.*

(Continued)

*Primary Examiner*—Emmanuel L Moise
*Assistant Examiner*—Michael Pyzocha
(74) *Attorney, Agent, or Firm*—Hunton & Williams LLP (57) ABSTRACT

A system and method are disclosed for analyzing a network protocol stream for a security-related event. At least two states associated with the network protocol in which a first host system communicating with a second host system using the network protocol may be placed are identified. At least one valid transition between a first state of the at least two states and a second state of the at least two states is defined. The at least one valid transition is expressed in the form of a regular expression. The regular expression is used to analyze the network protocol stream.

21 Claims, 6 Drawing Sheets

U.S. PATENT DOCUMENTS

| | | | | |
|---|---|---|---|---|
| 6,604,075 | B1 * | 8/2003 | Brown et al. | 704/270.1 |
| 6,609,205 | B1 * | 8/2003 | Bernhard et al. | 713/201 |
| 6,628,624 | B1 * | 9/2003 | Mahajan et al. | 370/256 |
| 6,665,650 | B1 * | 12/2003 | O'Grady et al. | 706/12 |
| 6,665,725 | B1 * | 12/2003 | Dietz et al. | 709/230 |
| 6,704,874 | B1 | 3/2004 | Porras et al. | |
| 6,708,212 | B2 | 3/2004 | Porras et al. | |
| 6,711,615 | B2 | 3/2004 | Porras et al. | |
| 2003/0118029 | A1 * | 6/2003 | Maher et al. | 370/395.21 |

OTHER PUBLICATIONS

Vern Paxton: "Bro: a system for detecting network intruders in real-time" Computer Networks, Elsevier Science Publishers B.V., Amsterdam, NL, vol. 31, No. 23-24, Dec. 14, 1999, pp. 2435-2463, XP004415559 ISSN: 1389-1286.

James Hall et al.: "Counting the cycles: a comparative study of NFS performance over high speed networks" Local Computer Networks, 1997. Proceedings, $22^{ND}$ Annual Conference on Minneapolis, MN, USA Nov. 2-5, 1997, pp. 8-19, XP010252403 ISBN: 0-8186-8141-1.

* cited by examiner

FIG. 1

PRIOR ART

SYSTEM AND METHOD FOR ANALYZING PROTOCOL STREAMS FOR A SECURITY-RELATED EVENT

CROSS REFERENCE TO RELATED APPLICATIONS

This application claims priority to U.S. Provisional Patent Application No. 60/236,899 entitled SYSTEM AND METHOD FOR ANALYZING PROTOCOL STREAMS FOR A SECURITY-RELATED EVENT filed Sep. 28, 2000, which is incorporated herein by reference for all purposes.

This application is related to co-pending U.S. patent application Ser. No. 09/615,676 entitled SYSTEM AND METHOD FOR TRACKING THE SOURCE OF A COMPUTER ATTACK filed Jul. 14, 2000, which is incorporated herein by reference for all purposes; and co-pending U.S. patent application Ser. No. 09/615,961 entitled SYSTEM AND METHOD FOR PROTECTING A COMPUTER NETWORK AGAINST DENIAL OF SERVICE ATTACKS filed Jul. 14, 2000, which is incorporated herein by reference for all purposes; and co-pending U.S. patent application Ser. No. 09/615,888 entitled SYSTEM AND METHOD FOR DYNAMICALLY CHANGING A COMPUTER PORT OR ADDRESS filed Jul. 14, 2000, which is incorporated herein by reference for all purposes; and co-pending U.S. patent application Ser. No. 09/616,803 entitled SYSTEM AND METHOD FOR QUICKLY AUTHENTICATING MESSAGES USING SEQUENCE NUMBERS filed Jul. 14, 2000, which is incorporated herein by reference for all purposes.

FIELD OF THE INVENTION

The present invention relates generally to computer network security. More specifically, a system and method for analyzing protocol streams for a security-related event is disclosed.

BACKGROUND OF THE INVENTION

Figure 1:
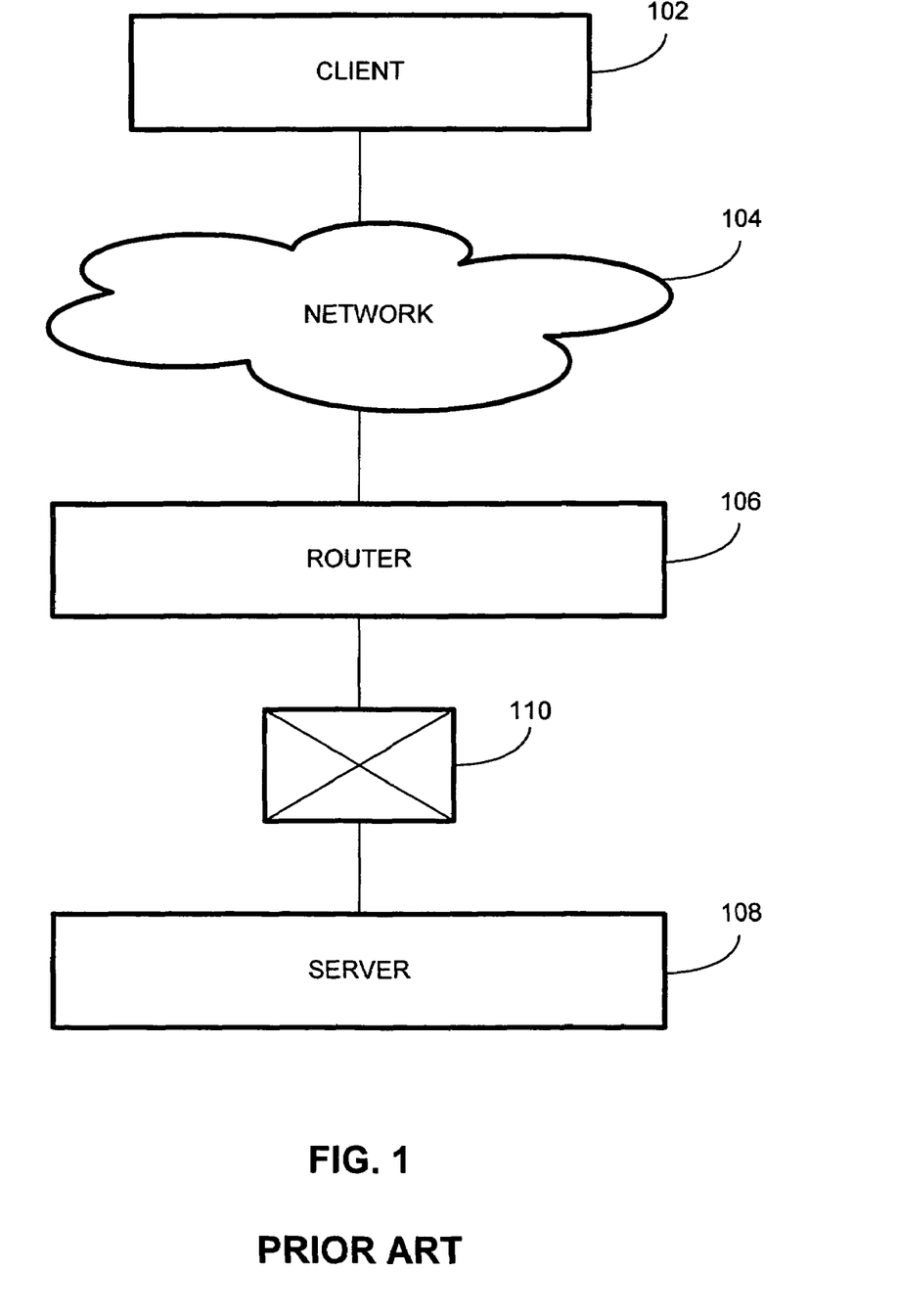
FIG. 1 is a schematic diagram illustrating a client computer configured to communicate with a server computer via a network.

A host computer is a computer configured to communicate with one or more other computers via a network. FIG. 1 is a schematic diagram illustrating a client computer configured to communicate with a server computer via a network. A client host computer system 102 is connected via network 104 to a router 106. The router 106 is associated with a server host computer system 108 and connected to server host computer system 108 via a switch 110. The network 104 may be a public network, such as the Internet or the public switched telephone network (PSTN), or another network, such as a virtual private network (VPN) or other private network.

A network protocol may be used to facilitate communication between computers such as client 102 and server 108 shown in FIG. 1. Some well-known examples of such a protocol include the Hypertext Transfer Protocol (HTTP), which is used by browser software to enable users to navigate the World Wide Web, and the Simple Mail Transfer Protocol (SMTP), used to send and receive electronic mail messages. One important network protocol is the Transmission Control Protocol (TCP), which is the basic communication protocol that enables computers to communicate via the Internet.

HTTP and SMTP are application layer protocols, used to provide certain functionality to users (e.g., browser, in the case of HTTP, or electronic mail in the case of SMTP). Application layer protocols such as HTTP and SMTP may be employed in connection with more basic communication protocols, such as TCP, to send and receive messages via a network. The TCP protocol provides for the exchange of data in the form of discrete data packets. A communication session is established with the destination host computer. The outgoing message is broken into discrete packets, each assigned a sequence number indicating its place in the message. The packets may be received out of order, or not, and are reassembled at the destination host computer using the sequence numbers.

When a computer system, such as server 108 of FIG. 1, is made accessible to one or more other computers via a network, the computer may be exposed to an attack aimed at destroying data or equipment associated with the computer, gaining unauthorized access to data or other resources, or denying access or use of the computer to others.

One way to identify a potential attack on a network-connected computer system, such as server 108 of FIG. 1, is to check the data packets as they are received to determine if a packet or group of packets matches a string or pattern associated with a prior attack or known type of attack. For example, router 106 may be configured to serve as a firewall that screens incoming packets and attempts to identify strings or patterns that may indicate that an attack is taking place. Such a firewall may be configured to send an alert to a system administrator, for example, if a suspect string or pattern is matched. This approach is limited, however, to the detection of attacks that are the same as, or very similar to, prior attacks.

A second approach makes limited use of knowledge about the network protocol being used by the computers to communicate. For example, the router 106 may be configured to serve as a firewall or proxy programmed to screen incoming data packets to determine if they are valid under the network protocol being used. For example, a validly formatted request to synchronize would be delivered to the server, but a request to synchronize that was not validly formatted (for example, it exceeded a length limitation) or a packet that did not correspond to any valid symbol or command for the protocol would be rejected and not delivered to the server.

This latter approach, however, is limited to the validation of the format of individual messages and does not provide for the analysis of the entire protocol stream to identify a possible attack.

Moreover, neither of the approaches described above provides an efficient way to represent the various states in which either the client or server system may be with respect to a network protocol communication session, the interrelationship between states, nor the permissible transitions between states defined by the protocol, for purposes of modeling a normal and valid protocol stream and identifying possible attacks by detecting deviations from such normal and valid behavior. Therefore, there is a need for a way to efficiently model normal and valid protocol streams and to detect when an actual protocol stream deviates from the normal and valid behavior in a way that may indicate that an attack is taking place.

SUMMARY OF THE INVENTION

A system and method for analyzing protocol streams for a security-related event is disclosed. Regular expressions are used to implement a state machine, which efficiently models both normal and permissible behavior under a network protocol and known or anticipated potential deviations from such behavior. Deviations from normal and permissible behavior under the protocol are identified and processed.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

A method for analyzing a network protocol stream for a security-related event is disclosed. In one embodiment, at least two states associated with the network protocol in which a first host system communicating with a second host system using the network protocol may be placed are identified. At least one valid transition between a first state of the at least two states and a second state of the at least two states is defined. The at least one valid transition is expressed in the form of a regular expression. The regular expression is used to analyze the network protocol stream.

A system for analyzing a network protocol stream for a security-related event is disclosed. In one embodiment, the system comprises a computer configured to receive and analyze the network protocol stream by processing a regular expression, the regular expression corresponding to a valid transition from a first state of at least two states to a second state of the at least two states. Memory associated with the computer is configured to store the regular expression.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Application-layer network protocols such as HTTP, POP, and SMTP define a set of symbols, and rules for using them, which enable host computers to tell each other what they want to do. For example, a protocol may define symbols to be used to communicate requests to synchronize (establish a communication session), to acknowledge the receipt of requests, and to otherwise respond to requests (such as by providing requested information or an indication that a communication session has successfully been established). The rules of the protocol may define, for example, which sequences of symbols are valid (e.g., which symbols it is valid to send in response to a particular symbol received from another), the permissible length of messages (or a certain type of message), and which symbols correspond to commands that may only be sent by a user having a particular level of authorization or privilege.

All network protocols may be described as a set of states. For instance, in HTTP there is a state when the client first establishes communication with the server, a state after a request is sent when the client is waiting for a response from the server, and another state when the communication session is finished and about to be closed. The current state of the client system, for example, depends on which symbols have been interchanged between the client and the server.

Specific types of messages indicate that a state transition has taken place—and some types of state transitions indicate that a security related event has taken place, such as a possible attack. For instance, a SMTP (simple message transfer protocol, an e-mail protocol) client should not try to send a message without first identifying itself.

A system and method are disclosed for analyzing protocol streams to detect state transitions that indicate that a security related event has or may have taken place.

Figure 2:
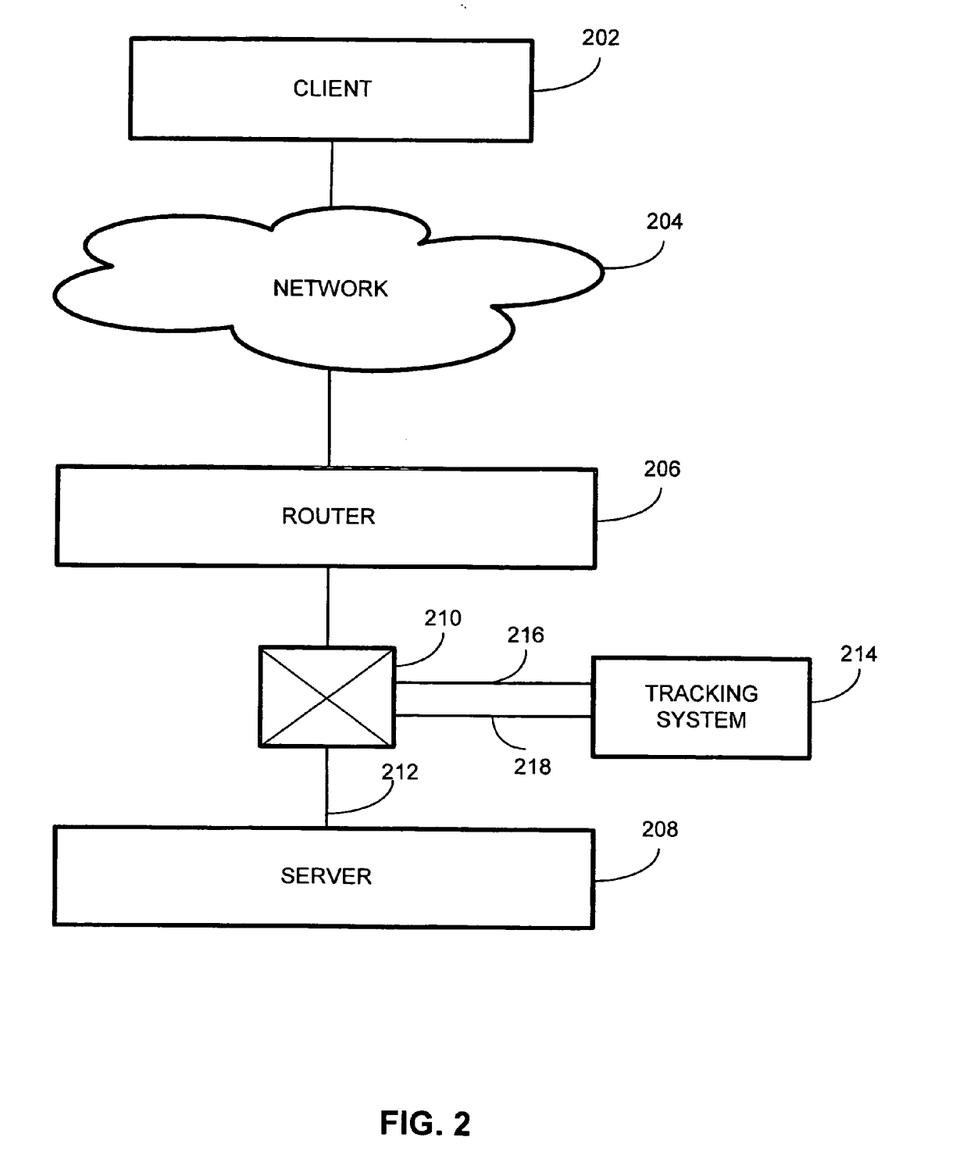
FIG. 2 is a schematic diagram illustrating a client system connected to a server system via a network in which a tracking system has been installed to perform certain security services.

FIG. 2 is a schematic diagram illustrating a client system connected to a server system via a network in which a tracking system has been installed to perform certain security services. The client 202 is connected via network 204 with a router 206. The router 206 is connected to a switch 210 associated with the router. The switch 210 is also connected to the server 208 via a network connection 212. Messages sent from client 202 to server 208, for example, would be sent via network 204, received by router 206, and delivered to server 208 via switch 210.

The system has been modified from the arrangement shown in FIG. 1 to incorporate a tracking system 214 connected to the switch 210 by means of a network connection 216. The tracking system 214 is also connected to the switch 210 by means of a copy port connection 218. The copy port connection 218 enables the tracking system to copy all network traffic that crosses a given port in the switch, using the copy port functionality described in co-pending U.S. patent application Ser. No. 09/615,676, previously incorporated herein by reference. For example, the tracking system 214 may receive via copy port connection 218 a copy of all network packets crossing the port of switch 210 connected to server 208 via network connection 212, thereby enabling tracking system 214 to receive a copy of all packets being delivered to or sent by server 208.

In one embodiment, the traffic communicated between client 202 and server 208 via network 204 is completed using a packet switched network protocol, such as the TCP/IP suite of protocols. In such an embodiment, messages sent by client 202 to server 208, and vice versa, are organized into one or more discrete packets and each packet is sent separately to the destination. Each packet includes, for example, identifying information indicating the source address and the destination address for the packet, such as the IP address of the sender and the IP address of the intended recipient along with the port number being used by the sender to send the packet and the port number to be used by the recipient to receive the packet. In addition, each packet includes a sequence number indicating its proper placement in the series of packets being sent by the sender to the recipient. The sequence number is used by the recipient system to place the packets received from the sending system in the correct order, enabling the recipient system to reassemble the message into its proper order.

Figure 3:
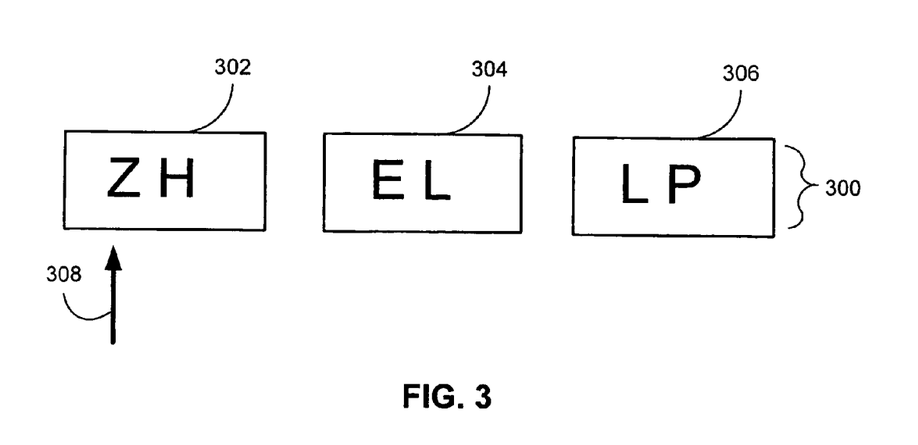
FIG. 3 illustrates a hypothetical portion of a stream of data comprising three packets, each packet containing two characters, such as may be sent by client 202 as a message (or portion thereof) to server 208 of FIG. 2.

FIG. 3 illustrates a hypothetical portion of a stream of data comprising three packets, each packet containing two characters, such as may be sent by client 202 as a message (or portion thereof) to server 208 of FIG. 2. The data stream portion 300 comprises a first packet 302, a second packet 304, and a third packet 306. As described above, in one embodiment, each packet would have a header associated with it indicating the sending party's IP address and port number, the receiving party's IP address and port number, and a sequence number. For example the recipient system may receive first packet 302 first, third packet 306 second, followed by second packet 304 last. The sequence numbers associated with each respective packet would be used by the recipient system to reassemble the data stream in the proper order, as shown in FIG. 3.

The tracking system 214 may be configured in one embodiment to receive via copy port connection 218 a copy of all traffic being delivered to or sent by server 208 via network connection 212. The tracking system would associate each incoming packet of the packet stream being sent by client 202 to server 208 with a communication session between client 202 and server 208 being tracked by tracking system 214. In one embodiment, the tracking system would assemble packets sent from client 202 to server 208, and vice versa, into their proper order, thereby enabling the tracking system 214 to analyze the messages being transmitted between client 202 and server 208.

In one embodiment, a copy of the data stream portion 300 is stored in the tracking system for analysis and a pointer 308 is employed to keep track of the starting point for the string of message characters currently being analyzed by the tracking system. In FIG. 3, the pointer 308 is shown positioned at the first character of first packet 302, indicating that the tracking system is currently analyzing the string of characters beginning with the character "Z".

In one embodiment, a copy of the entire data stream is stored in the tracking system until analysis of the data stream has been completed. In one embodiment, a copy of the data stream is not stored if the tracking system receives the packets of the data stream in order. In one such embodiment, the data packets are analyzed as they are received, and only the following information is stored by the tracking system: an identification of the current state, an identification of the current symbol or string being matched, and sufficient bytes of past data to enable further analysis of the portion of the data stream being analyzed in the event of a failed match. For example, in one embodiment if the portion of the data stream beginning with the character "Z" in data packet 302 of FIG. 3 were under analysis, no data packets of the data stream prior to packet 302 would be stored.

As described more fully below, in one embodiment the tracking system is configured to systematically analyze strings of characters included in messages exchanged between client 202 and server 208 to identify specific characters, strings of characters, operations, requests, commands, and the like that may indicate that a security event, such as an attempt to gain unauthorized access to data stored in server 208 or to cause server 208 to perform some unauthorized operation or service, may be taking place. The analysis by the tracking system of packet streams such as packet stream 300 of FIG. 3 is described in detail below.

As described above, a network protocol may be understood and represented as a plurality of states in which a host system communicating under the network protocol may be placed by sending and receiving messages having the format and content prescribed by the network protocol specification. Using the network protocol specification, it is possible to construct a state machine which keeps track of the current state of a host system participating in a communication session using a network protocol by tracking the messages exchanged via the network by the host system and the system or systems with which it is communicating. Such a state machine must be configured to recognize commands that are valid under the network protocol specification and which result in a transition from one state to another. For example, a client system in an initial unsynchronized state may seek to establish communication using the network protocol with a server system. The initial state for the client system would be the "unsynchronized" state. The client system may seek to establish communication with the server system by sending a synchronization request message to the server system. Under certain network protocols the client system and the server system would then exchange a series of acknowledgement and reply messages, until both sides had sent messages establishing the communication session between them and all messages sent by each side for the purpose of establishing the communication session had been acknowledged by the other side. Once the final acknowledgement message had been sent and received, the client system would transition from the unsynchronized state to a synchronized state. Invalid messages sent by a client system to a server system, for example, would not be recognized under the network protocol and may result in the client system transitioning to an error state in which, for example, an error message would be displayed to the user of the client system indicating that an impermissible or unrecognized operation had occurred preventing establishment of the communication session with the server system.

The above simplified example shows how an operation such as the establishment of a new communication session may be modeled as a set of states, in this case the unsynchronized state, the synchronized state, and the error state, and a set of rules defining transitions between those states. In one embodiment, a tracking system such as tracking system 214 of FIG. 2 is configured to recognize the various states in which either a client system or a server system may be placed under a network protocol and to keep track of the current state of the client system or the server system, or both, by monitoring the messages exchanged between the client system and the server system to identify, based on the rules set forth in the network protocol specification, when messages that result in a state transition for either the client system or the server system have been sent or received, as appropriate, by the affected system.

By using such a state machine to model normal and permitted behavior and conditions under a network protocol, a tracking system such as tracking system 214 of FIG. 2 may be configured to identify deviations from the normal and permitted behavior under the protocol. In one embodiment, at least certain deviations from the normal and permitted behavior under the network protocol may indicate that a security event, such as described above, is taking place. In one embodiment, the tracking system is configured to recognize such deviations from the normal and permissible protocol behavior and take appropriate corrective action, such as alerting a network administrator that the event has taken place, terminating the communication session between the client and the server, and/or gathering and sharing information to identify the source of the attack. Various possible responses to such a security event are described more fully in co-pending U.S. patent application Ser. No. 615,676, which was previously incorporated herein by reference.

Figure 4:
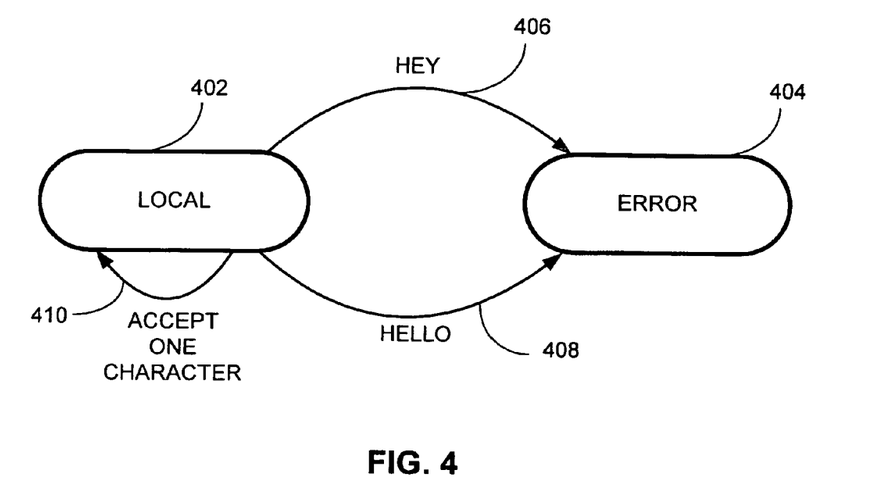
FIG. 4 is a state diagram representing two possible states in which a hypothetical system may be placed.

FIG. 4 is a state diagram representing two possible states in which a hypothetical system may be placed. The first state illustrated is the local state 402, which in this example indicates a normal operating state called "local". The second state shown in FIG. 4 is the error state 404. The error state 404 may be a state in which the system would find itself if the data stream being sent by the system indicated an illegal or unrecognized operation. In the example shown in FIG. 4, there are two possible error conditions. The first error condition is the "HEY" error condition, represented in FIG. 4 by HEY error condition transition 406. The HEY error condition 406 indicates that if the data stream being sent by the system includes the character string H-E-Y, an error condition exists and the system transitions from the local state 402 to the error state 404. Such a transition may result, for example, in the sending of an error message associated with the HEY error. The second error illustrated in FIG. 4 is represented by the HELLO error transition 408. The system would transition from the local state to the error state via the HELLO error transition, for example, if the data stream being sent by the system contained the string H-E-L-L-O. The "accept one character" transition 410 shown in FIG. 4 indicates that if neither the HEY string nor the HELLO string is found to be present in the string of characters in the data stream sent by the system that begins at the point currently being analyzed, such as a point indicated by a pointer such as pointer 308 of FIG. 3, the system advances one character to the next character in order and remains in the local state.

While the simple example shown in FIG. 4 may be illustrated by means of a state diagram in the simple and straightforward manner shown, the implementation of even a simple state diagram such as that shown in FIG. 4 in an actual tracking system, such as tracking system 214 of FIG. 2, would be considerably more complex. Computer code would have to be written in a programming language, such as C, to cause the tracking system to conduct a series of compare operations to determine if the string of characters beginning at the point in the data stream at which the pointer is located contains the string of letters H-E-Y or the string of letters H-E-L-L-O.

Figure 5:
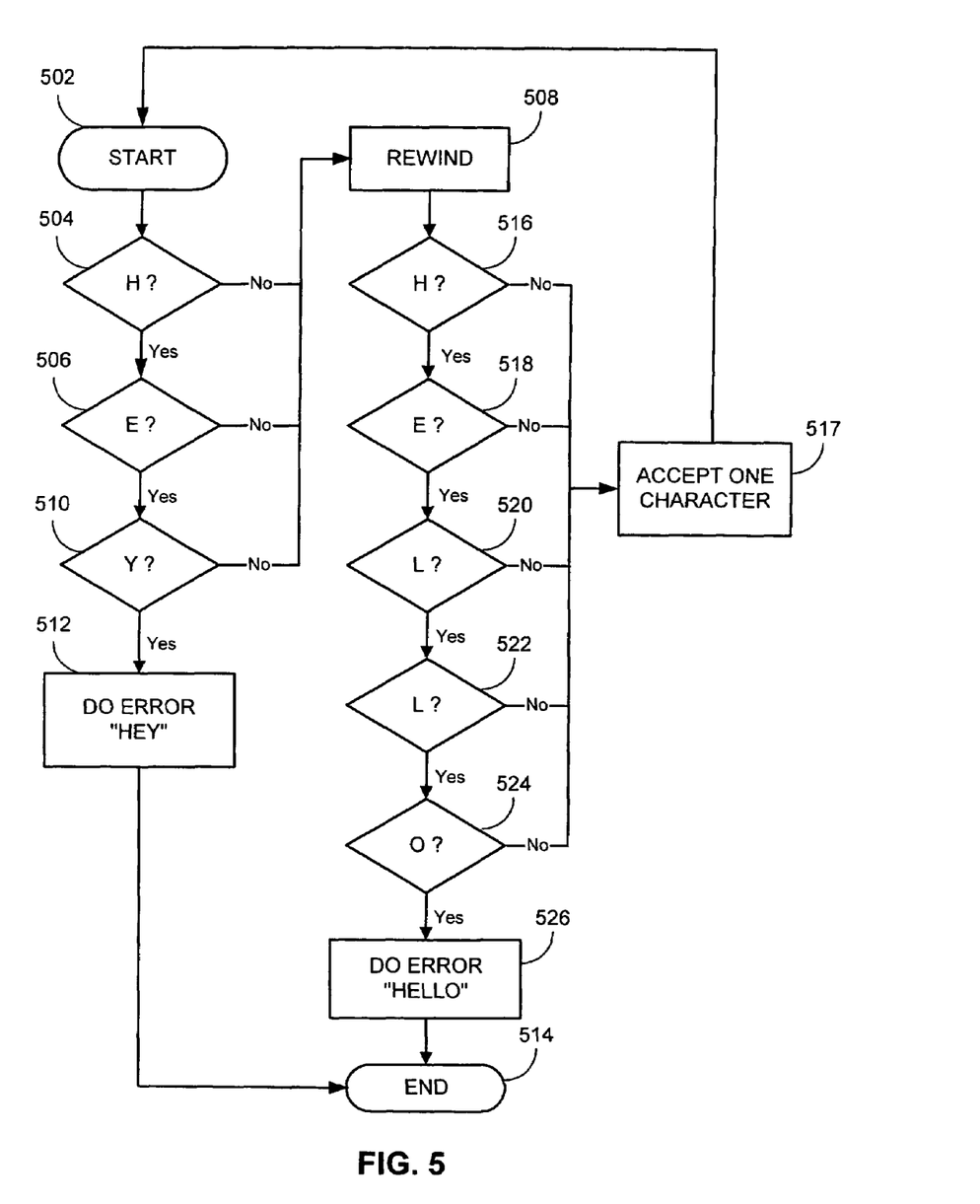
FIG. 5 is a flow diagram illustrating one approach that may be used to conduct such a series of compare operations.

FIG. 5 is a flow diagram illustrating one approach that may be used to conduct such a series of compare operations. The process starts at step 502 at which a pointer such as pointer 308 of FIG. 3 is pointing at an initial character in the data stream under analysis. The process proceeds to step 504 in which it is determined whether the character at which the pointer is pointing is the letter H. If the character at which the pointer is pointing is an H, the process proceeds to step 506 in which it is determined whether the first character following the character at which the pointer is pointing is the letter E. If it is instead determined in step 504 that the first character is not an H, the process proceeds to step 508, termed the rewind step in FIG. 5, in which the focus of analysis returns to the initial character at which the pointer is pointing. Assuming the initial character is found to be an H in step 504, if it is determined in step 506 that the first character following the character at which the pointer is pointing is not an E, the process again proceeds to step 508 and analysis resumes starting at the initial character at which the pointer is pointing. If instead in step 506 it is determined that the first character following the character at which the pointer is pointing is an E, the process proceeds to step 510 in which it is determined whether the second character following the character at which the pointer is pointing is a Y. If the second character following the character at which the pointer is pointing is not a Y the process proceeds to step 508 and analysis being again beginning with the character at which the pointer is pointing. If it is determined in step 510 that the second character following the character at which the pointer is pointing is a Y, the process proceeds to step 512 and the error "HEY" is performed. In one embodiment, an error message may be sent to a network administrator indicating that the "HEY" error has taken place with respect to the system under analysis. If the HEY error is performed in step 512, the analysis ends in step 514. If in step 510, it is determined that the second character following the character at which the pointer is pointing is not a Y, the process proceeds to step 508 and analysis begins again, starting with the initial character at which the pointer is pointing.

If the process advances to step 508 at any point in any one of the steps described above, the process then advances to step 516 in which it is determined whether the initial character at which the pointer is pointing is an H. If it is determined in step 516 that the initial character is not an H, the process advances to step 517 in which the one character at which the pointer is pointing is accepted as valid and the pointer is advanced to the next character in order. If the one character is accepted in step 517 and the pointer advanced to the next character in order, the process returns to the start step 502 and continues, with analysis beginning at the new character at which the pointer is now pointing. If in step 516 it is determined that the first character is an H, the process proceeds to step 518 in which it is determined whether the first character following the character at which the pointer is pointing is an E. If the first character following the character at which the pointer is pointing is not an E, the process proceeds to step 517 and one character is accepted and the pointer advanced. If it is determined in step 518 that the first character following the character at which the pointer is pointing is an E, the process advances to step 520 in which it is determined whether the second character following the character to which the pointer is pointing is an L. If it is determined in step 520 that the second character following the character at which the pointer is pointing is not an L, the process advances to step 517 and one character is accepted and the pointer advanced to the next character in order. If it is determined in step 520 that the second character following the character at which the pointer is pointing is an L, the process advances to step 522 in which it is determined whether the third character following the character at which the pointer is pointing also is an L. If it is determined in step 522 that the third character following the character at which the pointer is pointing is not an L, the process advances to step 517 in which one character is accepted and the pointer advanced to the next character in order. If it is determined in step 522 that the third character following the character at which the pointer is pointing is an L, the process advances to step 524 in which it is determined whether the fourth character following the character at which the pointer is pointing is the letter O. If it is determined in step 524 that the fourth character following the character at which the pointer is pointing is not the letter O, the process proceeds to step 517 in which the character at which the pointer is point is accepted and the pointer is advanced to the next character in order. If it is determined in step 524 that the fourth character following the character to which the pointer is pointing is an O, the process proceeds to step 526 in which the error "HELLO" is performed. The process then ends in step 514.

Relating the process shown in FIG. 5 to the state diagram shown in FIG. 4, at the initial start point 502, the system is understood to be in a local state 402 of the state diagram shown in FIG. 4. The DO ERROR "HEY" step 512 represents the HEY error transition 406 to the error state 404 of FIG. 4. Similarly the DO ERROR "HELLO" step 526 represents the HELLO error transition 408 of FIG. 4 to the error state 404. Finally, the ACCEPT ONE CHARACTER step 518 of FIG. 5 corresponds to the "accept one character" transition 410 of FIG. 4, which indicates that the system remains in the local state as analysis continues beginning with the next character in the data stream.

In one embodiment, as described above, the tracking system retains a copy of only that portion of the network protocol stream currently under analysis. In such an embodiment, a data packet is discarded once the portion of the protocol stream of which it is a part has been analyzed, such as by determining that the portion of the protocol was part of a recognized and permitted transition from one state to another, or part of an otherwise permitted string corresponding to the current state of the host system.

To illustrate further how the state machine shown in FIG. 4 as implemented by the process illustrated in the flow diagram of FIG. 5 operates, the operation of the state machine with respect to the data stream shown in FIG. 3 is presented here. As shown in FIG. 3, the pointer 308 is in an initial position pointing at the first character in the data stream portion 300, which is the letter Z. A tracking system such as tracking system 214 would begin analysis of the data stream at this point by performing the compare operations beginning at start step 502 of FIG. 5 and the first compare operation, which is step 504. Since the first character is the letter Z and not the letter H, the process would proceed from step 504 to step 508, in which the analysis would begin again with the character at which the pointer 308 is pointing. In step 516, it would be determined that the character at which the pointer is pointing is not the letter H, and the process would proceed to step 517. In step 517, the character to which the pointer is pointing, the letter Z, would be accepted as valid and the pointer 308 would be advanced to the next character in order, i.e., the second character of the data packet 302, which is the letter H. The process would then begin again with start step 502. In step 504, it would be determined that the character at which the pointer is pointing is an H and the analysis would proceed to step 506. In step 506, it would be determined that the first character following the character at which the pointer is pointing is an E, and the process would proceed to step 510. In step 510 it would be determined that the second character following the character at which the pointer is pointing is not the letter Y and the process would proceed to step 508 in which the focus of analysis would return to the character to which the pointer is pointing, which is the second character of the first data packet 302. In step 516, it would be determined that the character at which the pointer is pointing is an H, and the analysis would proceed to step 518. In step 518, it would be determined that the first character following the character at which the pointer is pointing is the letter E, and the process would proceed to step 520. In step 520, it would be determined that the third character following the character at which the pointer is pointing is the letter L and the process would proceed to step 522. In step 522 it would be determined that the third character at which the character is pointing is the letter L, and the process would proceed to step 524. In step 524, it would be determined that the fourth character following the character at which the pointer is pointing, which in the example shown in FIG. 3 is the letter P, is not the letter O and the process would proceed to step 517 in which the character to which the pointer is pointing would be accepted and the pointer would advance to the next character in order, which would be the first character of second data packet 304. At this point, in an embodiment in which only those data packets comprising part of the protocol stream currently under analysis are stored in the tracking system, the first data packet 302 would be discarded. The process would then resume again with the start step 502, and so on.

One can see from FIG. 5 that extensive computer code would need to be written to implement even a simple state machine such as that shown in FIG. 4. Actual network protocol state machines are much more complex, comprising many more different possible states for each of a large number of different operations, many of the states having multiple possible transition paths to one or more other states.

Figure 6:
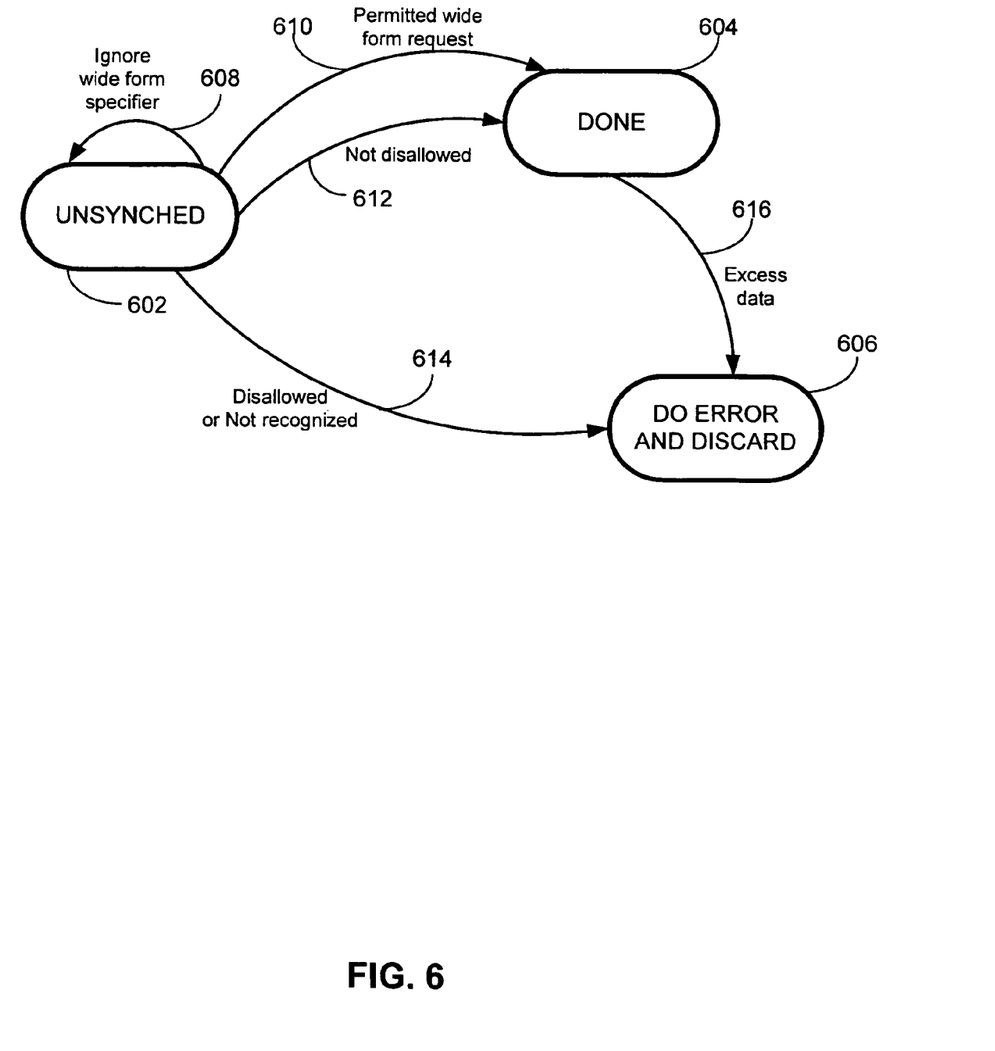
FIG. 6 is a state diagram representing the three possible states for a client system during a finger request operation under a network protocol such as the TCP/IP protocol.

FIG. 6 is a state diagram representing the three possible states for a client system during a finger request operation under a network protocol such as the TCP/IP protocol. A finger request is a special type of request, defined under the network protocol, which enables a requesting party to obtain certain information about the party to whom the finger request is sent. For example, a proper use of a finger request may be to obtain the name or other identifying information of a user associated with an e-mail address. However, as described more fully below and as known to those of ordinary skill in the art of computer network security, the finger requests may also be used improperly to gain improper access to or control over a target computer system.

As shown in FIG. 6, the client system begins in the "finger request unsynchronized" state 602, in which the client system sends a finger request specifier, defined by the network protocol, followed by data indicating the specific nature of the finger request. The client system remains in the unsynchronized state 602 until it has made a transition to one of the two other states shown in FIG. 6. The first other state is the "finger request done" state 604, which is the state to which the client system transitions if it completes a valid and permissible finger request. The second possible state to which the client system may transition from the unsynchronized state 602 is the "do error and discard" state 606, in which in one embodiment an error message is sent to a network administrator or other designated user and the tracking system discards the data stream from its analysis.

The state diagram shown in FIG. 6 shows five possible transitions. The first is the "ignore wide form specifier" transition 608. The wide form specifier is used to indicate a special type of finger request. For example, the characters "/W" may indicate a wide form request. Because a wide form request may be a proper finger request, the character string "/W" is ignored by the tracking system and the client system state is maintained as the unsynchronized state 602. Analysis continues beginning with the first character that follows the wide form specifier.

The second transition shown in the state diagram of FIG. 6 is the "permitted wide form request" transition 610. For the finger protocol, a permitted wide form request is comprised of the wide form specifier followed by a carriage return and line feed. If the data stream being analyzed indicates that a permitted wide form request has been entered and completed by the client system, the client system is transitioned from the finger request unsynchronized state 602 to the finger request done state 604.

The third transition illustrated in FIG. 6 is the "not disallowed" transition 612, by which the client system is transitioned from the "finger request unsynchronized" state 602 to the "finger request done" state 604 if a finger request that is neither a permitted wide form request, nor a specifically disallowed or not recognized request, is completed by the client system. If the data received from the client system instead indicates a finger request that is either not recognized or is specifically disallowed, the client system transitions via the "disallowed or not recognized" transition 614 to the "do error and discard" state 606, in which an error message or alert is sent as described above. Examples of finger requests which may be specifically disallowed or which may not be recognized as valid finger requests may include requests containing certain characters or strings of characters that may indicate an attempt to gain unauthorized access to or control over a protected system, such as by use of a known back door, a purely numeric finger request, or a request that contains certain metacharacters.

Once the client system has transitioned to the "finger request done" state 604, the tracking system continues to monitor data received from the client system to confirm that no excess data is sent by the client system after the finger request has been completed successfully. If such excess data is received from the client system after the completion of the finger request, the client system is transitioned from the "finger request done" state 604 to the "do error and discard" state 606 via the "excess data" transition 616. The sending of excess data after the completion of an otherwise valid finger request may indicate that a security event is taking place.

In the state diagram of FIG. 6, the normal and permitted behavior under the network protocol is represented by the "finger request unsynchronized" state 602, the "finger request done" state 604, and the transition paths 608, 610, and 612. The latter elements model and represent the normal and permissible behavior of the client system under the network protocol for the finger request operation. The transitions 614 and 616, along with the "do error and discard" state 606, illustrate and represent deviations from the normal and permissible network protocol behavior, which deviations are understood by the tracking system, such as tracking system 214 of FIG. 2, to indicate a possible security event.

As one can see from the state diagram shown in FIG. 6, the flow diagram necessary to implement the state machine illustrated in FIG. 6 would be considerably more complicated than the flow diagram shown in FIG. 5, which implements the state machine shown in FIG. 4. The state machine in FIG. 6 has three states instead of the two shown in FIG. 4, as well as more transitions between states. In one embodiment, the "disallowed or not recognized" transition path 614 of FIG. 6 may represent a plurality of such transition paths, analogous to the HEY path 406 and the HELLO path 408 of FIG. 4. That is, each disallowed character or string may be associated with a different transition path from the "finger request unsynchronized" state 602 to the "do error and discard" state 606, and each may be associated with its own error operation or message, as described more fully below.

To avoid the necessity to write computer code to implement a series of comparison steps, such as those shown in FIG. 5, the state machine shown in FIG. 6 may be implemented more efficiently and concisely by creating a series of regular expressions, which together describe the various possible states in which a system may be placed under the network protocol and the various possible transitions between states. The regular expressions may then be compiled to generate the specific code, such as code in the C programming language, which can be further compiled to translate the regular expressions into machine code understandable by the tracking system computer. A "regular expression" is a type of mathematical expression, which provides a quick and efficient way to identify the presence of a character or string of characters in a data stream or set. The Free Online Dictionary of Computing defines "regular expression" as follows:

"Any description of a pattern composed from combinations of symbols and the three operators:

Concatenation—pattern A concatenated with B matches a match for A followed by a match for B.

Or—pattern A-or-B matches either a match for A or a match for B.

Closure—zero or more matches for a pattern."

Free Online Dictionary of Computing (Denis Howe 1993) (presently found at http://foldoc.doc.ic.ac.uk/foldoc/index.html).

Using regular expressions, a computer may be programmed to identify the presence of the character or character string being sought and to take appropriate action in response to the character or character string being found in the data stream. The use of regular expressions was pioneered by mathematician Stephen Cole Kleene in the mid-1950's as a notation to easily manipulate "regular sets", formal descriptions of the behavior of finite state machines, in regular algebra. Kleene's work is summarized in S. C. Kleene, "Representation of Events in Nerve Nets and Finite Automata" (1956, Automata Studies, Princeton), which is incorporated herein by reference for all purposes. Additional background information regarding regular expressions may be found in J. H. Conway, "Regular Algebra and Finite Machines" (1971, Chapman & Hall, Eds.), which is incorporated herein by reference for all purposes. Additional background information concerning the use of regular expressions can be found in the book entitled, "Mastering Regular Expressions," by Jeffrey E. F. Fried (O'Reilly 1997), which is incorporated herein by reference for all purposes.

The set of regular expressions used in one embodiment to implement the state machine shown in FIG. 6 is presented below, with line numbers added for ease of reference in the discussion that follows:

```
1     tcp_server discard_state;
2     tcp_client finger_client_unsynched;
3
4     state finger_client_unsynched {
5     %ignore wide form
6         "/W";
7             enter(finger_client_unsynched);
8
9         "/W\r\n";
10            enter(finger_client_done);
```

-continued

```
11
12        %detect backdoors
13            "ypi0ca";
14                doerror(FINGER_CDK_BACKDOOR);
15                enter(discard_state);
16
17            "search";
18                doerror(FINGER_SEARCH_REQUEST);
19                enter(discard_state);
20
21            "r[oO][oO]t";
22                doerror(FINGER_ROOT_REQUEST);
23                enter(discard_state);
24
25        %disallow a purely numeric request
26            "[0-9.]*\r\n";
27                doerror(FINGER_ONLYNUMERIC_REQUEST);
28                enter(discard_state);
29
30        %disallow some metacharacters
31        %if the request does not contain @, &, ;, ', $, /, <, or >
32        %followed by a carriage return and line feed, it's okay
33            "[^@&;'$/<>*\r]*\r\n";
34                enter(finger_client_done);
35
36        %else, it's something bad.
37        % if it contains the @ sign it's a forwarding request
38            "[^@&;'$/<>*\r]*@";
39                doerror(FINGER_FORWARDING_ATTEMPT);
40                enter(discard_state);
41
42        %else it violates the rule above for some reason we don't specifically
43        %enumerate here.
44            ".";
45                doerror(FINGER_BAD_REQUEST);
46                enter(discard_state);
47        }
48
49        state finger_client_done {
50        % alert if client sends anything after it has sent a complete request
51            ".";
52                doerror(FINGER_EXCESS_DATA);
53                enter(discard_state);
54        }
55
56    end;
```

Line 1 of the above set of regular expressions instructs the tracking system to ignore any messages sent by the server and focus only on the messages sent by the client to the server. Line 2 identifies the following regular expressions, through the end, as defining the state machine for the finger request operation, from the perspective of the client system. (Blank lines, such as line 3, and comments lines, which are those lines that begin with the percent character "%" and which do not operate as computer instructions, are not described in detail in this discussion of the above set of regular expressions but are included above for clarity and readability.) Lines 4-47 represent the finger request unsynchronized state, from the client side, and the various possible transitions from that state. Lines 49-54 represent the finger request done state, from the client side, and the possible transition from that state.

More specifically, lines 6 and 7 implement a transition from the finger request unsynchronized state back to the same state if the wide form request specifier characters "/W" are matched. This transition corresponds in one embodiment to the ignore wide form request transition 608 of FIG. 6.

Lines 9 and 10 implement a transition from the finger request unsynchronized state to the finger request done state if a permitted wide form request, comprising the wide form specifier "/W" followed by a carriage return and line feed (represented by the characters "\r\n"), is entered. This transition corresponds in one embodiment to the permitted wide form request transition 610 shown in FIG. 6.

Lines 13-23 implement three possible transitions from the finger request unsynchronized state to the finger client error and discard state. In one embodiment, the three transitions implemented by lines 13-23 detect so-called "backdoors", which may be used in some instances to gain unauthorized access to or control over a server system. Lines 13-15 detect the CDK backdoor by matching the string "ypi0ca" in a finger request. If the CDK backdoor is detected an error operation, such as sending an alert, is performed and the client is transitioned to the error and discard state. Lines 17-19 similarly perform a (different) error and transition the client to the discard state if the string "search" is matched. Lines 21-23 respond similarly if the regular expression "r[oO][oO]t" is matched, which would occur, for example, if the strings "root" or "r00t" or "ro0t" or "r0ot" appeared in the finger request. Each of the transitions defined by lines 13-23 correspond in one embodiment to one of a plurality of possible transitions corresponding to disallowed or not recognized transition 614 of FIG. 6.

Lines 26-28 operate to disallow purely numeric finger requests, which may indicate a security event. If a purely numeric request is detected, a corresponding error operation is performed and the client is transitioned to the error and discard state. In one embodiment, the transition defined by lines 26-28 is one of a plurality of possible transitions corresponding to disallowed or not recognized transition 614 of FIG. 6.

Lines 33-34 allow finger requests that have not violated any of the above-described rules and which do not contain any of the metacharacters indicated in the regular expression on line 33, such as "^", "@", "&", etc. If such an allowed finger request is detected, the client is transitioned to the finger client done state. The transition defined by lines 33-34 corresponds in one embodiment to the "not disallowed" transition 612 of FIG. 6.

Lines 38-40 and lines 44-46 define what happens if the rule defined by lines 33-34 is not satisfied, such as because the request contains one or more of the disallowed metacharacters. Lines 38-40 first check to see if the disallowed character "@" is included. If so, the request is flagged as a forwarding attempt, a corresponding error operation is performed, and the client is transitioned to the error and discard state. If the request does not satisfy the rule defined by lines 33-34 and is not found by operation of the regular expression on lines 38-40, i.e., it contains one or more disallowed metacharacters but not the "@" character, lines 44-46 operate to perform a generic "bad request" error operation and transition the client to the error and discard state. In one embodiment, the transition defined by lines 38-40 and the transition defined by lines 44-46 each is one of a plurality of possible transitions corresponding to "disallowed or not recognized" transition 614 of FIG. 6.

The final transition defined by the above set of regular expressions is defined by lines 51-53. This regular expression detects if any data is sent by the client system after the client system has transitioned to the finger client done state. If such excess data is detected, a corresponding error operation is performed and the client is transitioned to the error and discard state.

The use of regular expressions such as those described above enables one to quickly and efficiently implement a state machine to model normal and permitted network protocol behavior and to detect deviations from such behavior that may indicate that a security event has taken or is taking place. The use of regular expressions makes unnecessary the time-consuming task of writing detailed code to perform the series of compare and other operations that would otherwise be necessary to implement such a state machine.

As described above, a compiler must be provided to transform the regular expressions used to define the state machine, such as the regular expressions set forth above defining the finger request state machine, to transform the regular expressions into the computer code necessary to perform the compare and other operations needed to implement the state machine defined by the regular expressions. In one embodiment, the regular expressions are compiled by a custom compiler into optimum or nearly optimum C code, which C code is then further compiled by a C compiler provided with the tracking system to obtain the machine code understood and used by the tracking system computer to perform the computations and operations necessary to implement the state machine. Well-known techniques in the art of computer code compiler design are used to provide a compiler capable of implementing a state machine based on a set of regular expressions. Specific exemplary techniques are described in "Lex & Yacc", by John Levine, Tony Mason, and Doug Brown (O'Reilly 1992), which is incorporated herein by reference for all purposes.

In one embodiment, the process of implementing a set of regular expressions which describe a state machine is made even more efficient by taking advantage of similarities in the operations and computations that must be performed to implement two or more or the regular expressions used to define the state machine. For example, in the state machine shown in FIG. 4, one possible implementation of which is shown in FIG. 5, the first two characters of the HEY transition 406 and the HELLO transition 408, respectively, are the same.

Figure 7:
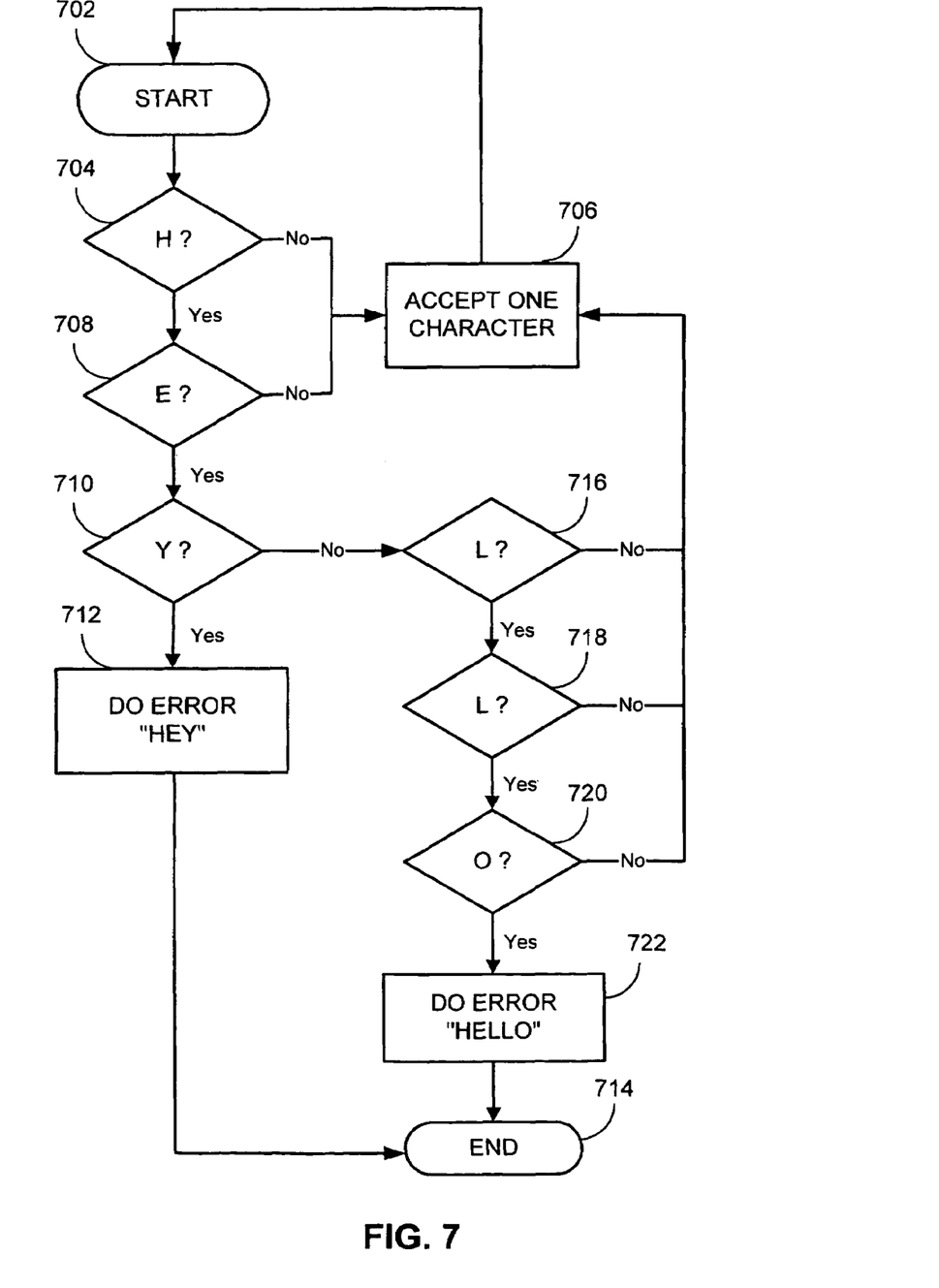
FIG. 7 is a flow chart illustrating a process that may be used to implement the state diagram of FIG. 4 as an alternative to the process shown in FIG. 5.

FIG. 7 is a flow chart illustrating a process that may be used to implement the state diagram of FIG. 4 as an alternative to the process shown in FIG. 5. The process starts at step 702 and proceeds to step 704 in which it is determined whether the character at which the pointer is pointing is the letter H. If it is determined in step 704 that the character at which the pointer is pointing is not the letter H, the process advances to step 706 in which the character at which the pointer is pointing is accepted and the pointer is advanced to the next character in order. The process then returns to the start step 702. If it is determined in step 704 that the character at which the pointer is pointing is an H, the process proceeds to step 708 in which it is determined whether the first character following the character at which the pointer is pointing is an E. If it is determined in step 708 that the first character following the character at which the pointer is pointing is not an E, the process proceeds to step 706 in which the character at which the pointer is pointing is accepted and the pointer is advanced to the next character in order. If it is determined in step 708 that the first character following the character at which the pointer is pointing is an E, the process proceeds to step 710 in which it is determined whether the second character following the character at which the pointer is pointing is the letter Y. If it is determined in step 710 that the second character following the character at which the pointer is pointing is the letter Y, the process proceeds to step 712 in which the "HEY" error is done. The process then ends in step 714. If it is instead determined in step 710 that the second character following the character at which the character is pointing is not the letter Y, the process proceeds to step 716 in which it is determined whether the second character following the character at which the pointer is pointing is the letter L. If it is determined in step 716 that the second character following the character at which the pointer is pointing is not the letter L, the process proceeds to step 706 in which the character at which the pointer is accepted as valid and the pointer advances to the next character in order. If it is determined in step 716 that the second character following the character to which the pointer is pointing is the letter L, the process proceeds to step 718 in which it is determined whether the third character following the character at which the pointer is pointing is the letter L. If it is determined in step 718 that the third character following the character at which the pointer is pointing is not the letter L, the process proceeds to step 706 in which the character at which the pointer is pointing is accepted as valid and the pointer is advanced to the next character in order. If it is determined in step 718 that the third character following the character at which the pointer is pointing is the letter L, the process proceeds to step 710 in which it is determined whether the fourth character following the character at which the pointer is pointing is the letter O. If it is determined in step 720 that the fourth character following the character at which the pointer is pointing is not the letter O, the process proceeds to step 706 in which the character to which the character is pointing is accepted and the pointer is advanced to the next character in order. If it is determined in step 720 that fourth character following the character to which the pointer is pointing is the letter O, the process proceeds to step 722 in which the error "HELLO" is done. The process then ends at step 714.

As one can see by comparing the process shown in FIG. 5 with the process shown in FIG. 7, the process shown in FIG. 7 includes a fewer number of comparison steps because, under the approach shown in FIG. 7, the step of determining whether the first and second characters match the letters H and E, respectively, is not repeated in performing the separate sets of comparison operations for each of the HEY transition and the HELLO transition, because those characters are common to the string that must be matched in order for either transition to apply. The result is that the number of computations that must be performed to implement the state machine shown in FIG. 4 is fewer using the implementation shown in FIG. 7 than it would be for the implementation shown in FIG. 5. In one embodiment, the compiler provided to transform the regular expressions used to define the state machine into computer instructions, such as computer code using the C programming language, that can be further compiled into machine code understandable to the tracking system computer is configured to recognize such similarities between adjacent regular expressions and to implement such regular expressions in the more efficient manner illustrated in the process shown in FIG. 7.

In one embodiment, a tool is provided that is configured to change the order of at least certain of the regular expressions used to define a state machine by seeking to place regular expressions having similarities, such as the similarity in the HEY transition and the HELLO transition of the state machine of FIG. 4, into adjacent positions to enable the compiler to take advantage of and use the more efficient approach illustrated in FIG. 7 instead of the less efficient approach illustrated in FIG. 5. For example, if in the state machine of FIG. 4 there were a third transition between the local state 402 and the error state 404 known as the RED transition, which transition applied if the string R-E-D appeared in the data stream, and further assuming that the state machine were defined by a series of regular expressions, including, in order, a regular expression defining the HEY error, followed by a regular expression defining the RED error, followed by a regular expression HELLO error, the tool would be configured to recognize the similarity between the HEY regular expression and the HELLO regular expression and to change the order in which the regular expressions are considered and compiled in order to enable the compiler to take advantage of the more efficient approach illustrated in FIG. 7 instead of the less efficient approach illustrated in FIG. 5. That is, the compiler would be able to implement the state machine in such a way that the comparisons necessary to determine whether the first and second characters in the portion of the data stream being analyzed matched the string portion H-E only one time, instead of repeating that analysis for each of the errors HEY and HELLO.

In one embodiment, the tool provided to change the order of at least certain of the regular expressions used to implement a state machine is configured to only change the order of regular expression defining like transition rules. For example, in the example described above, each of the transitions HEY, HELLO, and RED represented a similar transition between the local state 402 and the error state 404. If instead one of those transitions had defined a transition between the local state 402 and a third state not shown in FIG. 4, in one embodiment the tool provided to reorder regular expressions would not have changed the order in which the rules were considered. In one embodiment, the order of rules would not be changed if one or more of the rules containing the same string or portion of a string specified one or more ranges of characters that could be used to match one or more characters in the string. For example, the regular expression [AZ]OO would match either the string AOO or ZOO. Likewise, the regular expression Z[O-R][O-R] would match strings such as ZOO, ZOP, or ZPR, etc. In one embodiment, regular expressions incorporating such ranges or sets of characters would not be reordered by a tool such as the one described above. Likewise, in one embodiment, a set of regular expressions would not be reordered to place two wholly or partially similar regular expressions adjacent to each other if in one of the expressions the string defined by the regular expression were a permissible string and in the other of the regular expressions the string defined by the regular expression were impermissible.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for analyzing a network protocol stream for a security-related event, comprising:

identifying at least two valid states associated with a network protocol in which a first host system communicating with a second host system using the network protocol may be placed;

defining at least one valid transition between a first state of the at least two valid states and a second state of the at least two valid states;

expressing the at least one valid transition in the form of a first regular expression; defining an invalid state associated with the network protocol; expressing a plurality of invalid transitions from the first state to the invalid state as a plurality of regular expressions, the plurality of invalid transitions being direct transitions from the first state to the invalid state;

determining that a connection under the network protocol is in the first state;

a computer receiving a packet associated with the connection; and applying to the received packet associated with the connection:

the first regular expression to determine whether the packet is associated with the at least one valid transition, and the plurality of regular expressions to determine whether the packet is associated with one of a plurality of invalid transitions; and in the event it is determined by applying the plurality of regular expressions to the packet that the packet is associated with a particular one of the plurality of invalid transitions, taking a corresponding responsive action associated specifically with the particular one of the plurality of invalid transitions.

2. A method for analyzing a network protocol stream as recited in claim 1, further comprising compiling the first regular expression into computer code.

3. A method for analyzing a network protocol stream as recited in claim 2, wherein the computer code comprises code in the C programming language.

4. A method for analyzing a network protocol stream as recited in claim 2, wherein the computer code comprises optimal computer code.

5. A method for analyzing a network protocol stream as recited in claim 2, wherein the computer code comprises nearly optimal computer code.

6. A method for analyzing a network protocol stream as recited in claim 1, wherein using the first regular expression to analyze the network protocol stream comprises copying the network protocol stream to a third system and using the first regular expression to analyze the network protocol steam at the third system.

7. A method for analyzing a network protocol stream as recited in claim 6, wherein the network protocol stream comprises packets of data, each packet being associated with a sequence number indicating its position relative to other packets in the protocol stream, and the third system reassembles the packets into the order indicated by the respective sequence numbers of the packets received.

8. A method for analyzing a network protocol stream as recited in claim 7, wherein a copy of the network protocol stream is maintained in the third system until analysis has been completed.

9. A method for analyzing a network protocol stream as recited in claim 7, wherein in the event the packets are received by the third system in sequence number order, a copy is maintained in the third system only of those packets comprising the portion of the network protocol currently under analysis.

10. A method for analyzing a network protocol stream as recited in claim 1, further comprising keeping track of which of the at least two valid states the first host system currently is in.

11. A method for analyzing a network protocol stream as recited in claim 10, further comprising changing the tracked state of the first host system from the first of the at least two valid states to the second of the at least two valid states in the event the analysis of the network protocol stream indicates the at least one valid transition has taken place.

12. A method for analyzing a network protocol stream as recited in claim 1, wherein the invalid transition indicates that a security-related event has taken or is taking place.

13. A method for analyzing a network protocol stream as recited in claim 1, further comprising:
keeping track of which state, from the set comprising the at least two valid states and the invalid state, the first host system currently is in; and
changing the state of the first host system to the invalid state in the event that the analysis of the network protocol stream indicates the invalid transition has taken place.

14. A method for analyzing a network protocol stream as recited in claim 13, further comprising providing, in the event that the analysis of the network protocol stream indicates the invalid transition has taken place, an indication that the invalid transition has taken place.

15. A method for analyzing a network protocol stream as recited in claim 13, further comprising discontinuing analysis of the network protocol stream once the state of the first host system has been changed to the invalid state.

16. A method as recited in claim 1, wherein some of the plurality of regular expressions are grouped according to their similarity into adjacent positions for packet processing.

17. A method as recited in claim 1, wherein the plurality of invalid transitions correspond to a plurality of disallowed security events.

18. A method as recited in claim 1, wherein the plurality of invalid transitions correspond to a plurality of disallowed security events; and in the event that the packet is associated with one of the plurality of invalid transitions, the method further comprising performing error handling based on a disallowed security event that corresponds to said one of the plurality of invalid transitions.

19. A system for analyzing a network protocol stream between a first host system and a second host system for a security-related event, the first host system being susceptible to being placed under the network protocol in one of at least two valid states associated with the network protocol, the system comprising:
a computer configured to:
receive a network protocol stream;
determine that a connection under the network protocol is in a first state of the at least two valid states; and
apply to a received packet associated with the connection:
a first regular expression corresponding to a valid transition from the first state of the at least two valid states to a second state of the at least two states, and
a plurality of regular expressions corresponding to a plurality of invalid transitions from the first state of the at least two valid states to a predefined, invalid state, the plurality of invalid transitions being direct transitions from the first state to the invalid state; and
in the event it is determined by applying the plurality of regular expressions to the packet that the packet is associated with a particular one of the plurality of invalid transitions, take a corresponding responsive action associated specifically with the particular one of the plurality of invalid transitions; and
a memory associated with the computer and configured to store the first regular expression.

20. A system for analyzing a network protocol stream between a first host system and a second host system for a security-related event, the first host system being susceptible to being placed under the network protocol in one of at least two valid states associated with the network protocol, the system comprising:
means for receiving the network protocol stream; and
means for analyzing the network protocol stream by:
determining that a connection under the network protocol is in a first state of the at least two valid states;
applying to a received packet associated with the connection:
a first regular expression corresponding to a valid transition from the first state of the at least two valid states to a second state of the at least two valid states; and
a plurality of regular expressions, the plurality of regular expressions corresponding to a plurality of invalid transitions from the first state of the at least two valid states to a pre-defined, invalid state, the plurality of invalid transitions being direct transitions from the first state to the invalid state; and
in the event it is determined by applying the plurality of regular expressions to the packet that the packet is associated with a particular one of the plurality of invalid transitions, taking a corresponding responsive action associated specifically with the particular one of the plurality of invalid transitions.

21. A computer program product for analyzing a network protocol stream, the computer program product being embodied in a computer readable storage medium and comprising computer instructions for:
identifying at least two valid states in which a first host system communicating with a second host system using a network protocol may be placed;

defining at least one valid transition between a first state of the at least two states and a second state of the at least two valid states;

expressing the at least one valid transition in the form of a first regular expression; defining an invalid state associated with the network protocol; expressing a plurality of invalid transitions from the first state to the invalid state as a plurality of regular expressions, the plurality of invalid transitions being direct transitions from the first state to the invalid state;

determining that a connection under the network protocol is in the first state; and applying to a received packet associated with the connection:

the first regular expression to determine whether the packet is associated with the at least one valid transition, and the plurality of regular expressions to determine whether the packet is associated with one of a plurality of invalid transitions; and in the event it is determined by applying the plurality of regular expressions to the packet that the packet is associated with a particular one of the plurality of invalid transitions, taking a corresponding responsive action associated specifically with the particular one of the plurality of invalid transitions.

* * * * *